United States Patent
Zeng et al.

(10) Patent No.: US 11,594,014 B2
(45) Date of Patent: Feb. 28, 2023

(54) ANNOTATING HIGH DEFINITION MAP POINTS WITH MEASURE OF USEFULNESS FOR LOCALIZATION

(71) Applicant: NVIDIA CORPORATION, Santa Clara, CA (US)

(72) Inventors: Di Zeng, Sunnyvale, CA (US); Mengxi Wu, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 339 days.

(21) Appl. No.: 16/908,251

(22) Filed: Jun. 22, 2020

(65) Prior Publication Data

US 2020/0401845 A1 Dec. 24, 2020

Related U.S. Application Data

(60) Provisional application No. 62/865,082, filed on Jun. 21, 2019.

(51) Int. Cl.
*G06V 10/75* (2022.01)
*G06T 7/00* (2017.01)
*G06T 7/32* (2017.01)
*G06V 20/56* (2022.01)

(52) U.S. Cl.
CPC .............. *G06V 10/757* (2022.01); *G06T 7/32* (2017.01); *G06T 7/97* (2017.01); *G06V 20/56* (2022.01)

(58) Field of Classification Search
CPC .. G06V 10/757; G06V 20/56; G06V 2201/12; G06V 20/64; G06T 7/32; G06T 7/97
USPC ........................................................ 382/104
See application file for complete search history.

(56) References Cited

U.S. PATENT DOCUMENTS

2019/0197739 A1* 6/2019 Sinharoy ................ G06V 20/40

* cited by examiner

*Primary Examiner* — Stephen P Coleman
(74) *Attorney, Agent, or Firm* — Maschoff Brennan

(57) ABSTRACT

According to an aspect of an embodiment, operations may comprise obtaining a first point cloud that includes a first point. The operations also comprises obtaining a second point cloud that is a copy of the first point cloud and that includes a second point that is a copy of the first point. The operations also comprises moving the second point cloud with respect to the first point cloud according to a first vector. The operations also comprises identifying a closest point of the first point cloud that is closest to the second point of the second point cloud. The operations also comprises determining a second vector between the closest point and the second point. The operations also comprises determining a measure of usefulness of the first point based on the first vector and the second vector. The operations also comprises indicating the measure of usefulness of the first point.

30 Claims, 14 Drawing Sheets

ANNOTATING HIGH DEFINITION MAP POINTS WITH MEASURE OF USEFULNESS FOR LOCALIZATION

CROSS-REFERENCE TO RELATED APPLICATION

This patent application claims the benefit of and priority to U.S. Provisional App. No. 62/865,082 filed Jun. 21, 2019, which is incorporated by reference in the present disclosure in its entirety.

FIELD

This disclosure relates generally to high definition maps for autonomous vehicles, and more particularly, to annotating points in a high definition map with a measure indicating usefulness of the point for localization purposes.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

SUMMARY

According to an aspect of the embodiment, operations may comprise obtaining a first point cloud that includes a first point. The operations may also comprise obtaining a second point cloud that is a copy of the first point cloud and that includes a second point that is a copy of the first point. The operations may also comprise moving the second point cloud with respect to the first point cloud according to a first vector. The operations may also comprise identifying a closest point of the first point cloud that is closest to the second point of the second point cloud after moving the second point cloud. The operations may also comprise determining a second vector that indicates a locational relationship between the closest point and the second point. The operations may also comprise determining a measure of usefulness of the first point with respect to mapping other point clouds to the first point cloud based on a relationship between the first vector and the second vector. The operations may also comprise indicating the measure of usefulness of the first point in the first point cloud.

The subject matter claimed herein is not limited to embodiments that solve any disadvantages or that operate only in environments such as those described above. Rather, this background is only provided to illustrate one example technology area where some embodiments described herein may be practiced.

DETAILED DESCRIPTION

Overview

Figure 1:
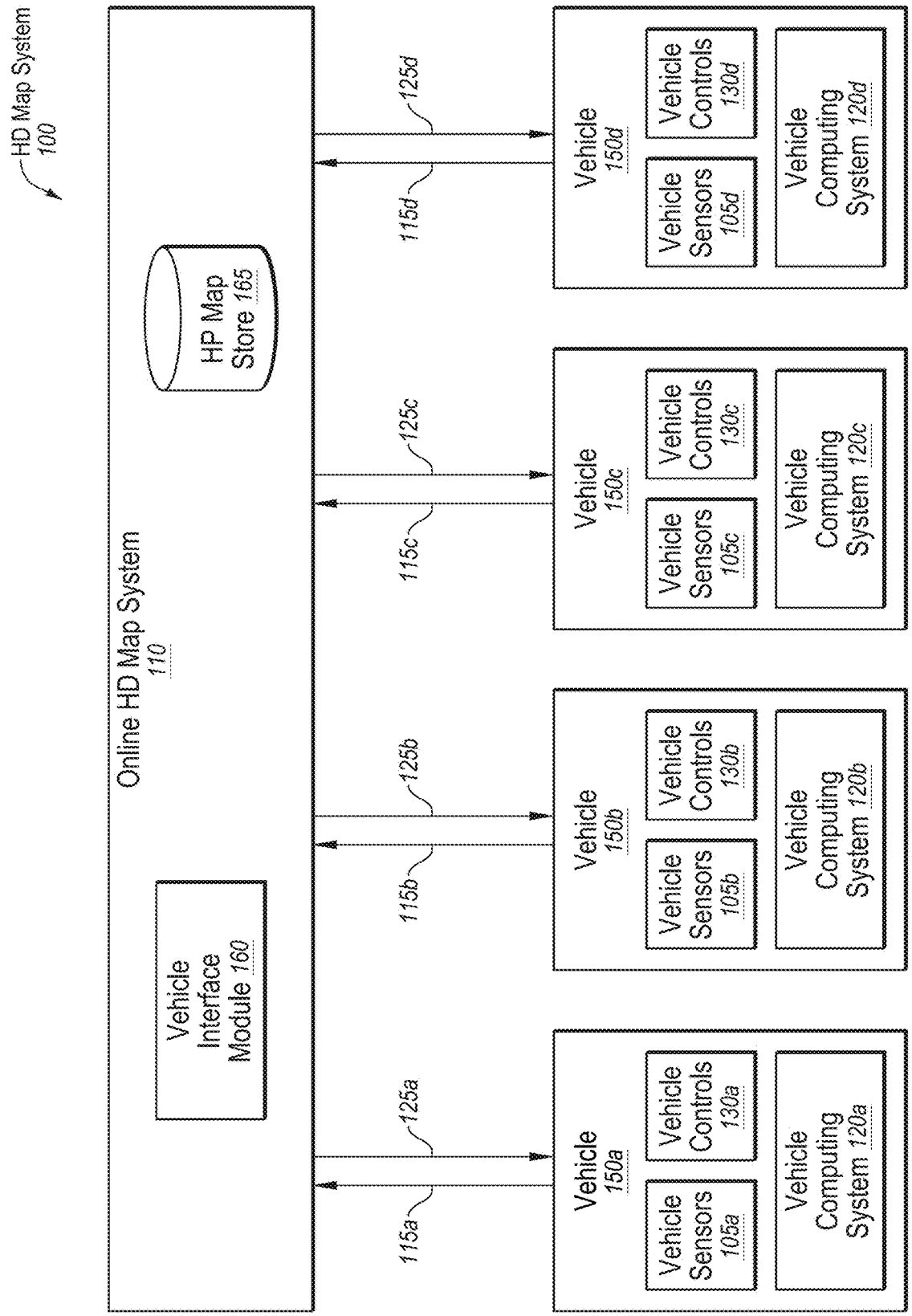
FIG. 1 illustrates an example overall system environment of an HD map system interacting with multiple vehicle computing systems.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, global positioning systems (GPS) may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. Geographic region, region, area, etc. may be used synonymously within this disclosure and may be used to describe a portion of land that may form part of the surface of the earth. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given region. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up to date, but up to date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for a given region. A region or area may refer to an area of land Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD map.

The autonomous vehicle may be a vehicle capable of sensing its environment and navigating without human input. An HD map may refer to a map that may store data with high precision and accuracy, for example, with accuracies of approximately 2-30 cm. The HD map may be represented using three-dimensional points. The three-dimensional points may have or may be annotated with usefulness values that may be related to mapping of point clouds onto each other (e.g., via Iterative Closest Point (ICP) operations). In some embodiments, the three-dimensional points may have or may be annotated with equal usefulness values. For example, the HD map may be represented using three-dimensional points that may have equal usefulness values and may have an equal effect on localization convergence and accuracy, which may be determined by mapping a scanned point cloud to a point cloud of the HD map.

The three-dimensional points having equal usefulness values may be problematic in localization scenarios, particularly where the region that may be portrayed by the HD map may not contain many features that may be used for localization and/or may contain only plain features, such as walls, roads, etc. Some additional examples of regions in an HD map that may be problematic in localization scenarios may be regions that may contain tunnels, parking lots, highways, etc. The three-dimensional points may have usefulness values which may affect localization and/or accuracy of the HD map.

In some embodiments, the three-dimensional points may have differing usefulness values with respect to mapping to other point clouds (e.g., via ICP operations), which may improve localization of vehicles and/or accuracy of the HD map. In some embodiments, the three-dimensional points that may be more helpful in localization convergence and accuracy may be identified and given higher usefulness values, and the three-dimensional points that may be less helpful in localization convergence and accuracy may be identified and given lower or zero usefulness values. The three-dimensional points that may be more reliable and/or helpful in localization convergence and accuracy than other three-dimensional points may be those points that may be less likely to change position with respect to time. For example, three-dimensional points that represent a portion of vertical flag pole may be more reliable and/or helpful in localization convergence and accuracy than three-dimensional points that represent a portion of a flag fixed at one end to a portion of the vertical flag pole because the portion of the flag is much more likely to change positions with respect to time.

An online HD map system may calculate or determine the usefulness values of the three-dimensional points of the HD map, which may allow for faster localization, more efficient localization, improved localization accuracy, HD map size reduction (e.g., by subsampling the HD map in proportion to usefulness values), and/or more efficient HD map updating with new point cloud data (e.g., by improving the adjusting of the pose of the new point cloud to the pose of the HD map data point cloud(s)).

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
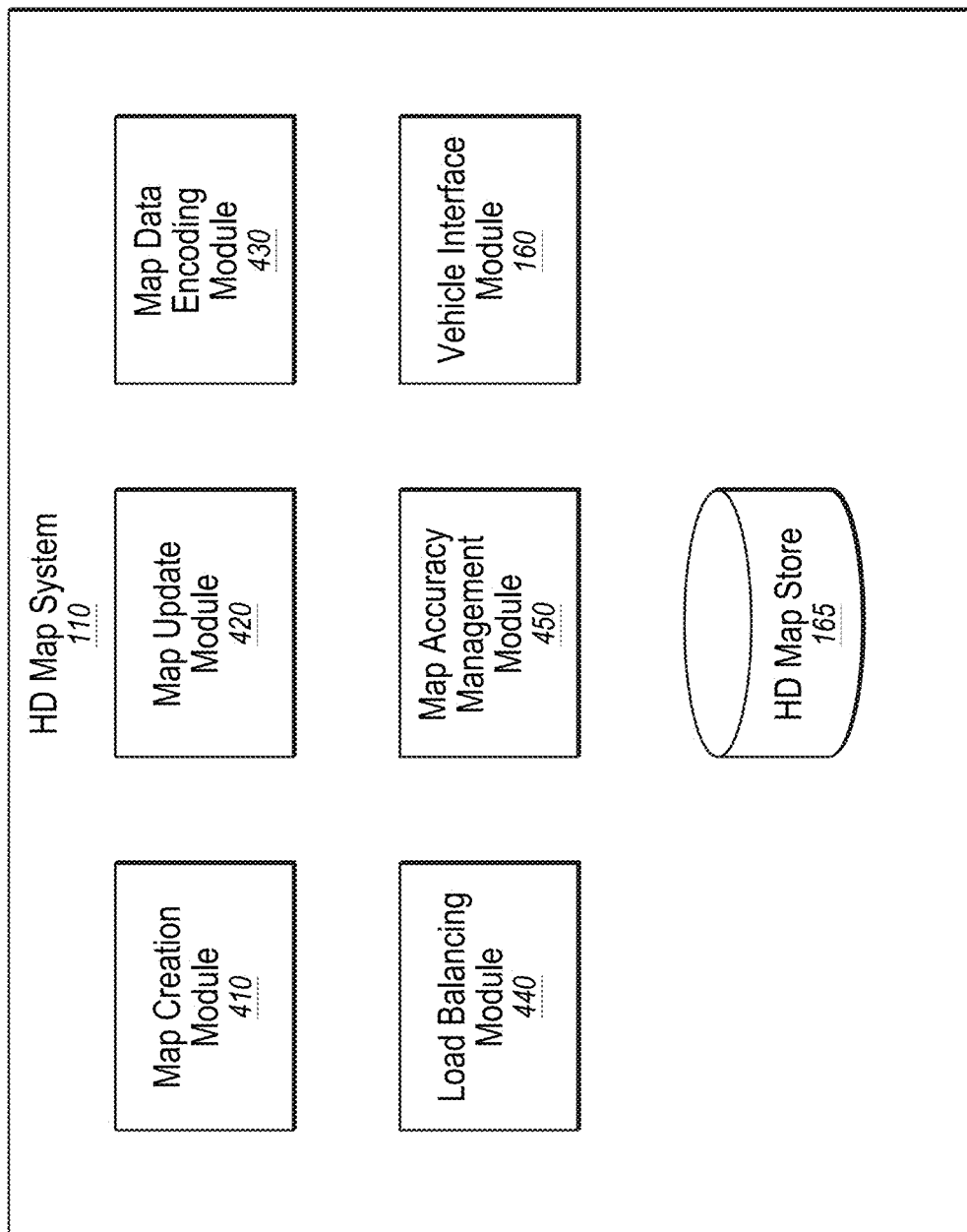
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a LIDAR sensor, a global navigation satellite system (GNSS) receiver, for example, a GPS navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
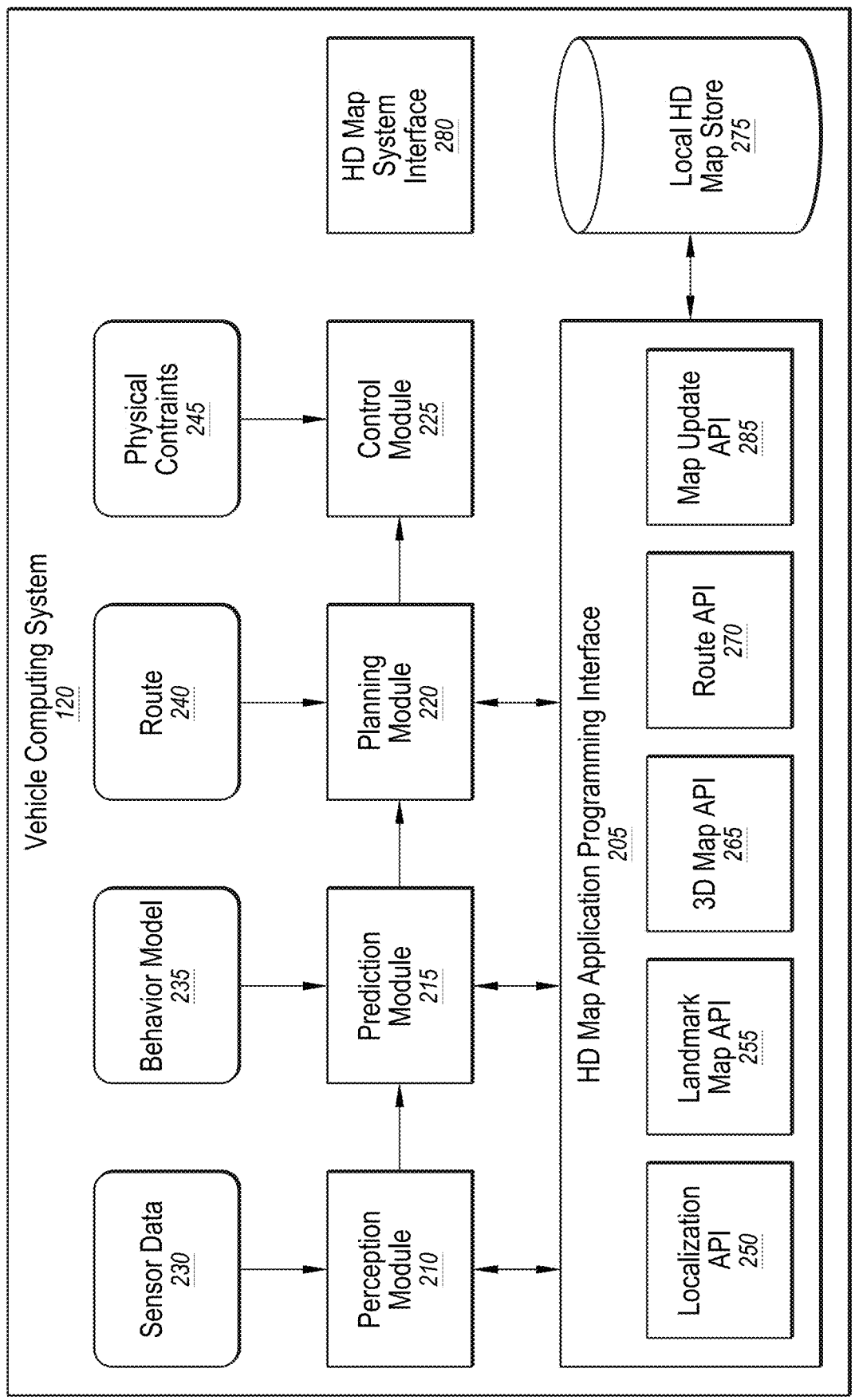
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, radar devices, etc. The perception module 210 may also be configured to use the sensor data 230 to determine what objects are around the corresponding vehicle 150, the details of the road on which the corresponding vehicle 150 is traveling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently traveling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up to date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up to date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
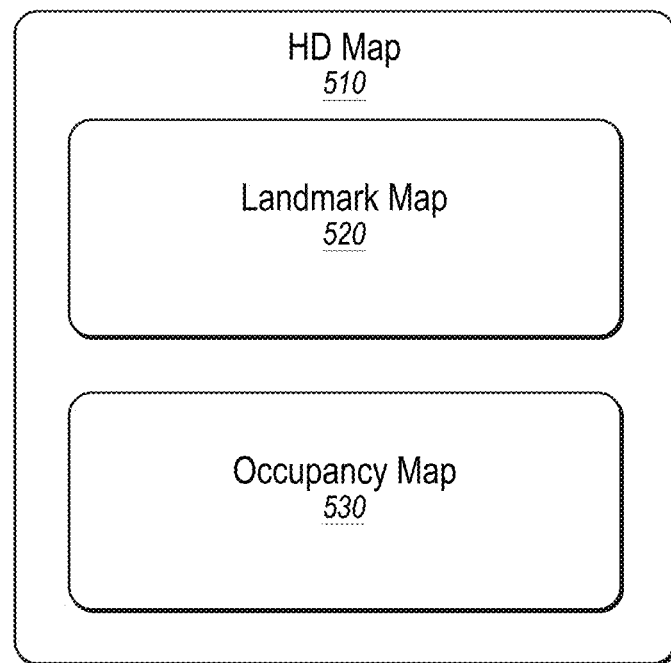
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4\times10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
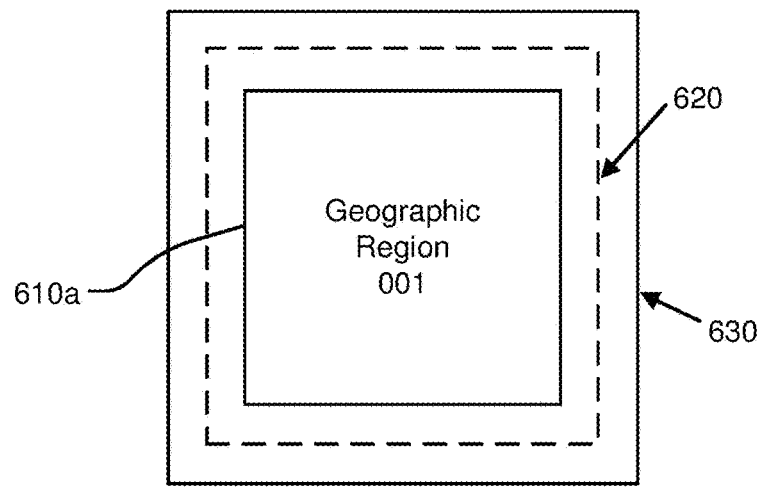
FIGS. 6A-6B illustrate example geographical regions defined in an HD map.
Figure 6B:
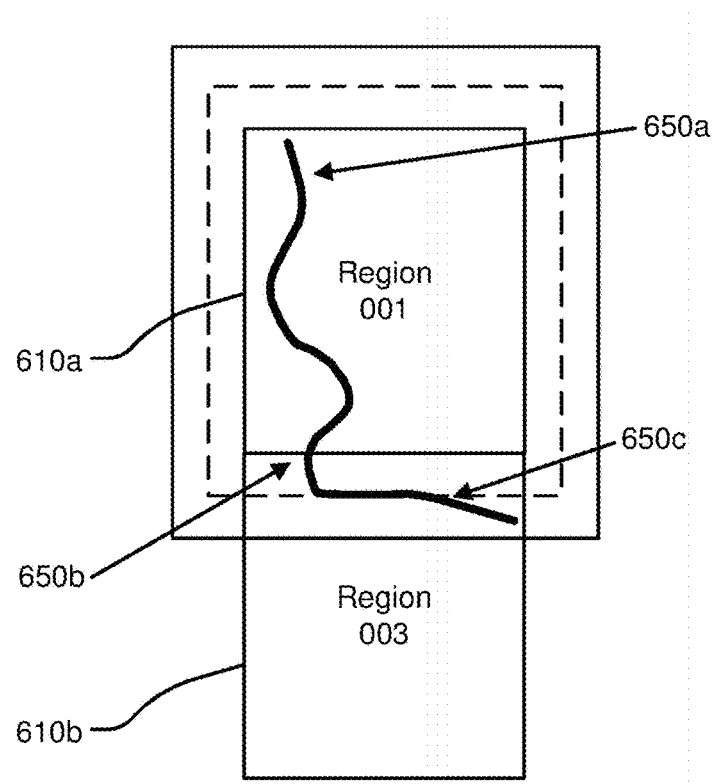

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6A-6B, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 traveling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
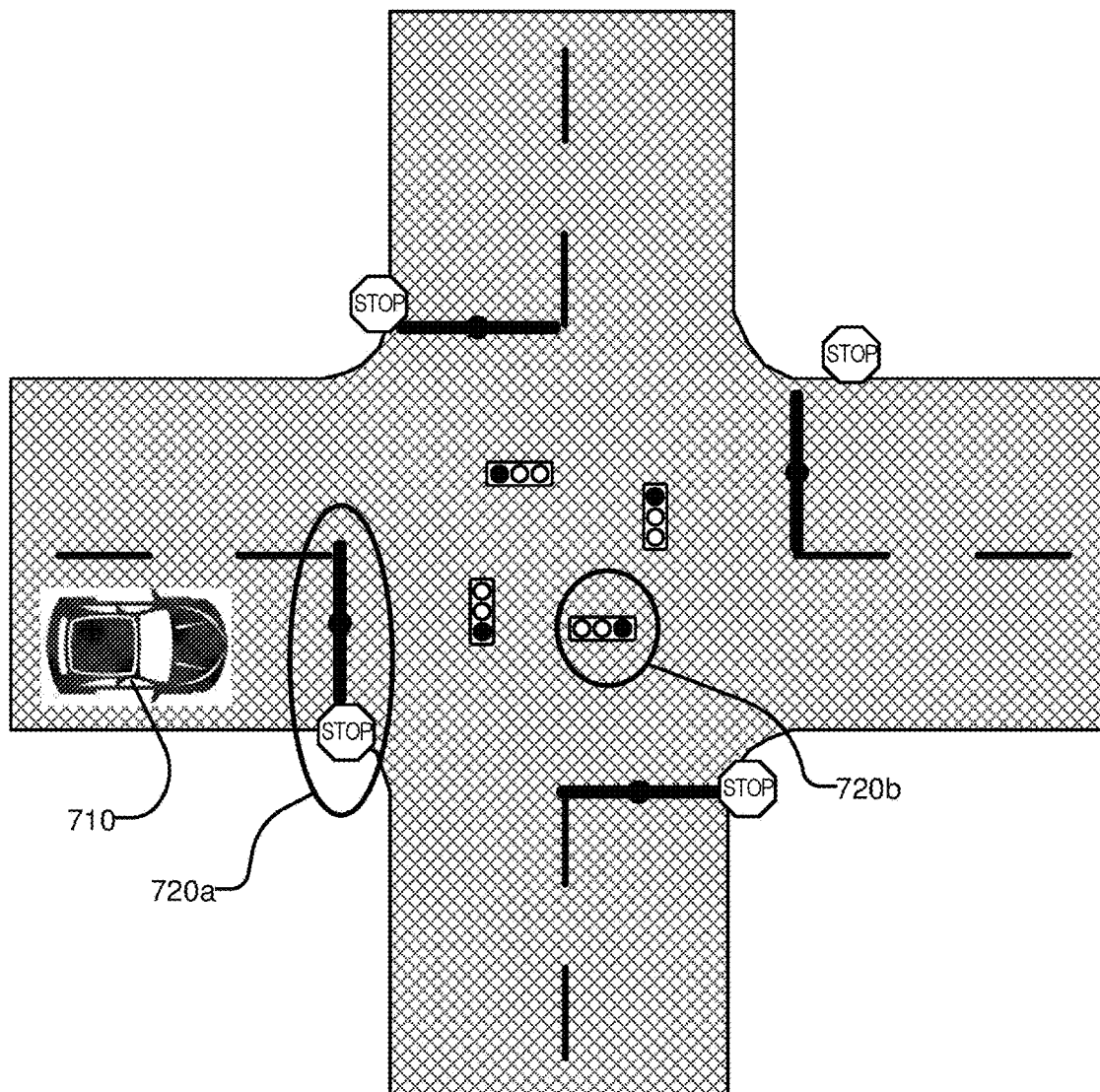
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc. as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
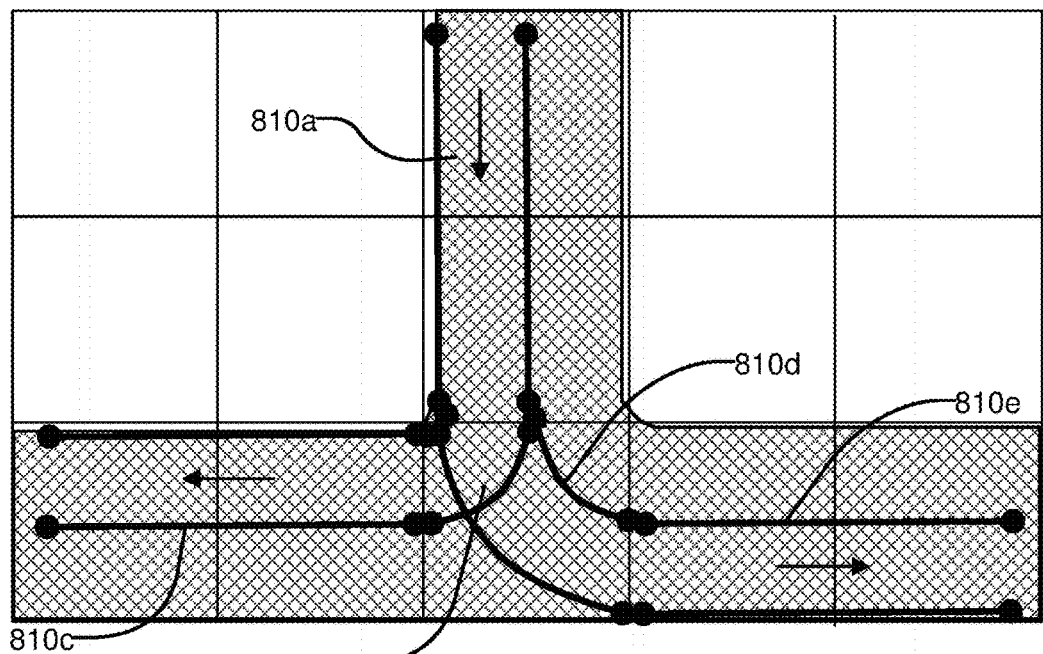
FIGS. 8A-8B illustrate example lane elements and relationships between lane elements in an HD map.
Figure 8B:
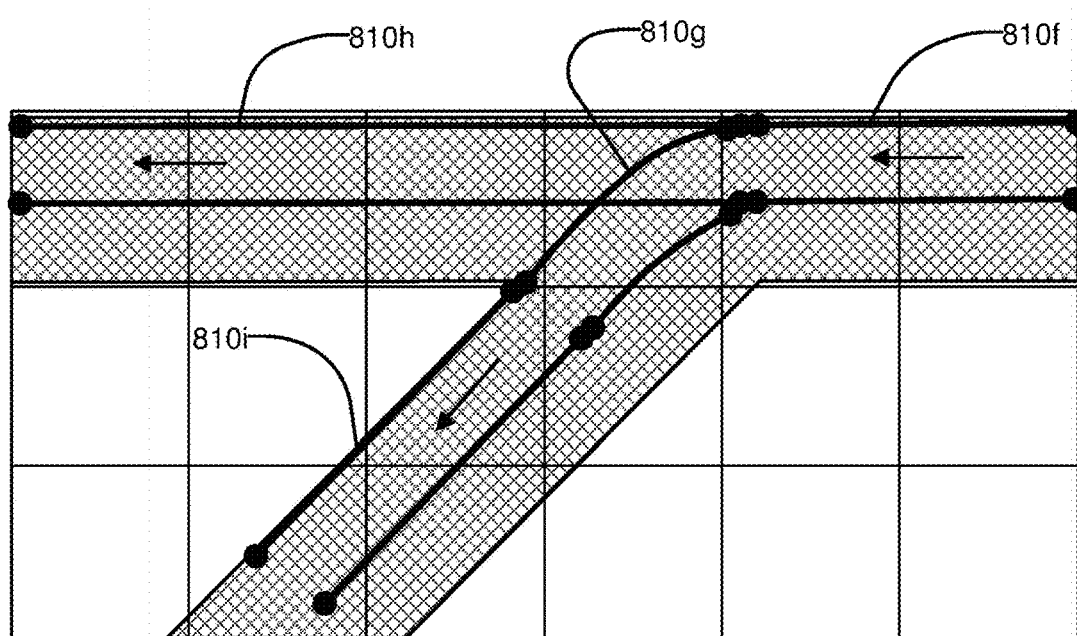

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and may be connected to lane 810*e* via a turn lane 810*d*. FIG. 8B illustrates an example of a Y-junction in a road illustrating label 810*f* that may be connected to lane 810*h* directly and may be connected to lane 810*i* via lane 810*g*. The HD map system 100 may determine a route from a source location to a destination location as a sequence of connected lane elements that may be traversed to reach from the source location to the destination location.

Localization Probability and Usefulness

Figure 9A:
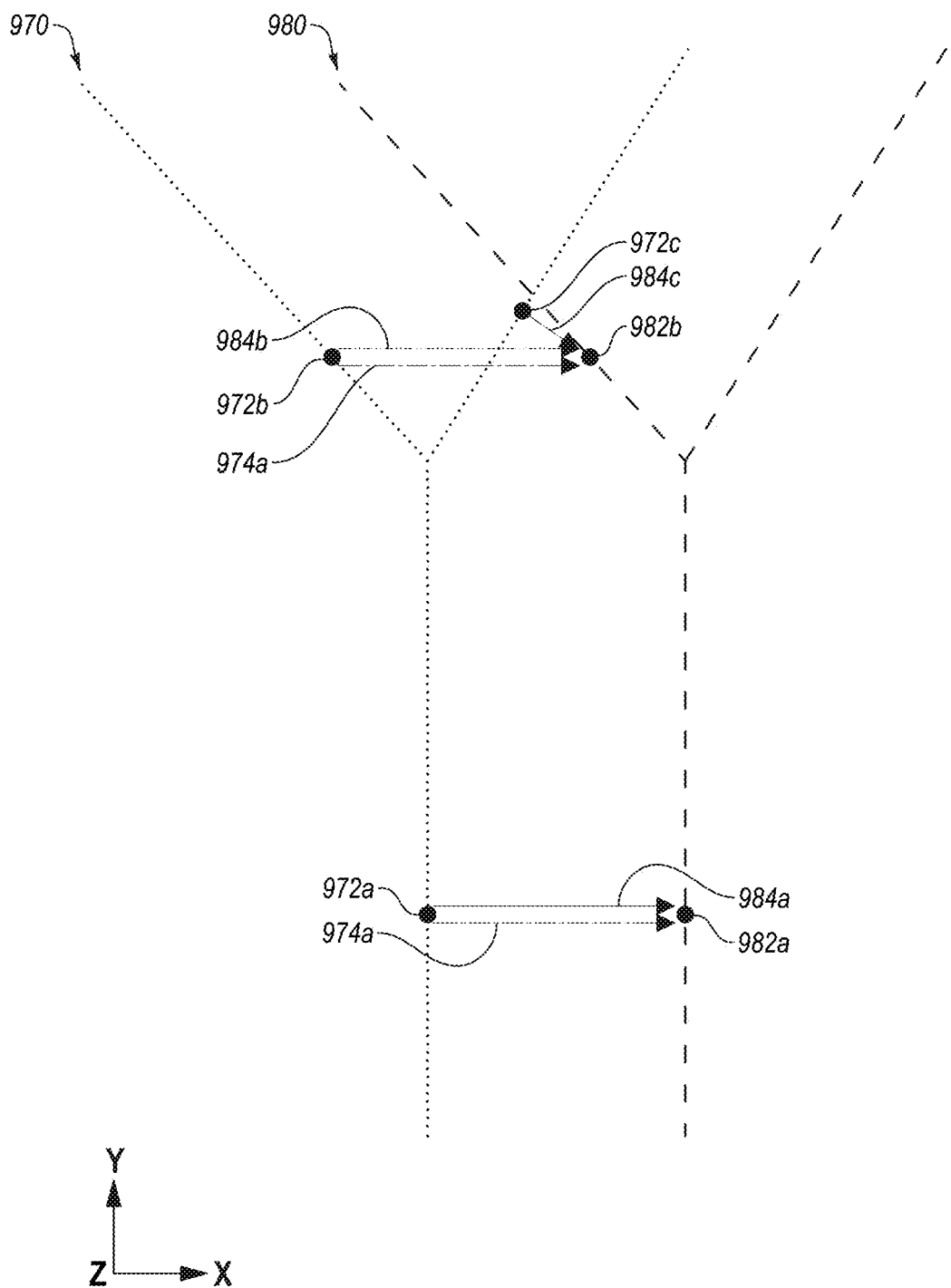
FIG. 9A illustrates an example of determining localization usefulness.
Figure 9B:
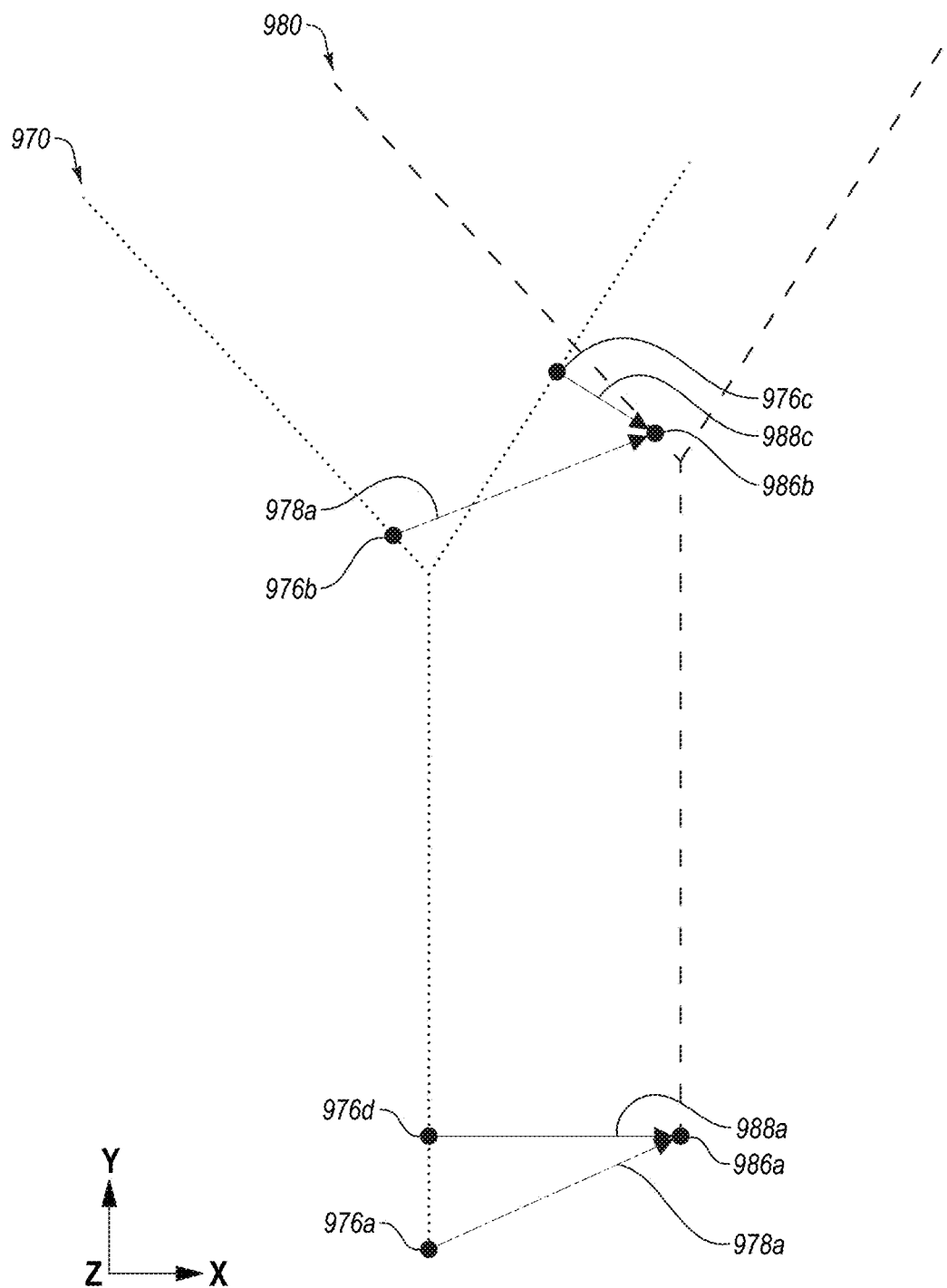
FIG. 9B illustrates another example of determining localization usefulness.

FIGS. 9A-9B illustrate an example method of determining localization usefulness that may be performed by the online HD map system 110. The online HD map system 110 may be configured to measure a localization usefulness and a localization probability of points in a point cloud. The localization usefulness values for a point may indicate a degree to which the point assists in a localization probability determination. Accordingly, the online HD map system 110 may measure a localization probability that may be used to determine which points in a point cloud may be more useful for localization and/or which points may be less useful for localization. In some embodiments, a point may be more useful for localization because it may cause a result of a localization calculation to converge to a determined result, reduce errors in the localization calculation, and/or increase the quality of the localization calculation. For example, a point may be more useful for localization because the point may cause the localization operations to move toward the determined result. Conversely, a point that causes the localization operations to move away from the determined result may be less useful for localization, cause a result of the localization calculation to diverge, and/or decrease the quality of the localization calculation.

The online HD map system 110 may assign higher usefulness to points of a point cloud which may be more likely to be more static (i.e., don't move) or to move more predictably than other points across multiple sensor scans and/or point clouds for localization purposes. The online HD map system 110 may add weights to points of the point cloud according to usefulness of the points. In some embodiments, the online HD map system 110 may assign higher weights to points of the point cloud that may be found to be more useful than other points or that may be determined to have more than a threshold amount of usefulness. Additionally or alternatively, the online HD map system 110 may assign lower weights to points of the point cloud that may be found to be less useful than other points or that may be determined to have less than a threshold amount of usefulness. For example, the online HD map system 110 may assign higher usefulness and/or assign higher weights to points representing tree trunks than to points representing tree leaves because the points representing tree trunks may generally be more static over time than the points representing tree branches or tree leaves and therefore may be more useful for performing localization. Accordingly, the online HD map system 110, based on the localization usefulness values, may weigh the points on the tree trunks higher, find the points to be more reliable, and/or find the points to be more useful than the points on the tree branches or tree leaves during localization. In some embodiments, the online HD map system 110 may ignore points that may be determined to be of lower usefulness for localization during the localization process and may use points that may be determined to be of higher usefulness to perform more efficient localization and to conserve processing power and/or memory of the online HD map system 110. For example, the online HD map system 110 may use only the points on the tree trunk to perform localization and may ignore the points on the tree branches or tree leaves, thus performing more efficient localization, reaching a desired localization more quickly, and conserving processing power and/or memory of the online HD map system 110.

An iteration of the localization probability calculation may be completed by the online HD map system 110 and may include, obtaining a first point cloud; copying the first point cloud to generating a second point cloud 970; moving the second point cloud 980 with respect to the first point cloud 970; identifying a closest point of the first point cloud 970 that is closest to the second point of the second point cloud 980; determining a locational relationship between the closest point and the second point; determining a measure of usefulness of the first point with respect to mapping other point clouds to the first point cloud 970 based on the locational relationship; and indicating the measure of usefulness of the first point in the first point cloud 970.

FIG. 9A illustrates an example of determining localization usefulness using the first point cloud 970 and the second point cloud 980. The first point cloud 970 may be obtained from an online HD map system 110 and may represent a ground pose. The ground pose may include a six-dimensional representation of the alignment, location, and/or orientation (e.g., x, y, z, roll, pitch, and yaw) of the vehicle 150. In some embodiments, the online HD map system 110 may receive sensor data collected by sensors of a plurality of vehicles 150 for a given area for the first point cloud 970. In some embodiments, the online HD map system 110 may compare and/or align the sensor data for the given area and may generate a first point cloud 970 and/or a ground pose.

The first point cloud 970 may include one or more points (e.g., points 972*a*, 972*b*, and 972*c*) with point data that may represent a feature of a region at a corresponding location. For example, the one or more points of the first point cloud 970 may represent a tree in the region. The point 972*a* may represent a portion of a trunk of the tree, the point 972*b* may represent a portion of a first branch of the tree, and the point 972*c* may represent a portion of a second branch of the tree. For purposes of explanation, the first point cloud 970 may be represented by the one or more points in an XY plane.

However, in some embodiments, the one or more points may include three-dimensional position data and may be represented in three dimensions.

The second point cloud 980 may be obtained by copying the first point cloud 970. In some embodiments, the second point cloud 980 may be obtained by identifying a set of points from the first point cloud 970 (e.g., by sampling from the first point cloud 970). In some embodiments, the second point cloud 980 may represent a guess pose. The guess pose may include a six-dimensional representation of the alignment, location, and/or orientation (e.g., x, y, z, roll, pitch, and yaw) of the vehicle 150. In some embodiments, the guess pose may be equivalent to the relationship between the location of the first point cloud 970 and the location of the second point cloud 980 and/or may represent the movement of the second point cloud 980 with respect to the first point cloud 970. However, the second point cloud 980 may be associated with any movement and may not necessarily be tied to the guess pose. The usefulness of the guess pose and/or the second point cloud 980 may vary depending on the direction of travel of the vehicle 150.

The second point cloud 980 may be moved (i.e., transformed, translated, and/or rotated) in one or more directions according to a first vector (e.g., 974*a* and 974*b*). The second point cloud 980 may be moved using various methods. For example, the second point cloud 980 may be moved in a random direction and by a random magnitude using random sampling. As another example, the second point cloud 980 may be moved systematically (e.g., in a systematic direction and/or magnitude) using systematic sampling of movement. In some embodiments, the systematic sampling of movement may be based on vectors in a given dimension or space (e.g., n vectors that span a given 3D space in the online HD map system 110). As another example, the second point cloud 980 may be moved in a given direction and/or magnitude based on the trajectory of the vehicle 150 at a given velocity, time, location, etc.

In some embodiments, the online HD map system 110 may move the second point cloud 980 in a first direction that may be consistent with a direction that the vehicle 150 may be traveling. For example, the online HD map system 110 may move the second point cloud 980 in the first direction such that the second point cloud 980 may be similar to a point cloud that the vehicle 150 would have obtained had the vehicle 150 obtained the point cloud via a lidar scan while traveling in the same or a similar direction. A movement of the second point cloud 980 in a given direction may be more useful than another movement for localization purposes. For example, a movement of the second point cloud 980 in the first direction may assist the online HD map system 110 to more quickly and/or efficiently determine which points to prioritize in the localization determination of the vehicle 150. Additionally or alternatively, the second point cloud 980 may be moved in a second direction, a direction that may not be consistent with the direction that the vehicle 150 may be traveling.

In some embodiments, the online HD map system 110 may find correspondences between the first point cloud 970 and/or ground pose and the second point cloud 980 and/or guess pose. For example, the second point cloud 980 may include one or more corresponding points (e.g., corresponding points 982*a* and 982*b*) that may correspond to the one or more points of the first point cloud 970 (e.g., points 972*a*, 972*b*, and 972*c*).

The online HD map system 110 may determine a closest particular point of the first point cloud 970 that may be closest to a particular point of the second point cloud 980. The closest particular point of the first point cloud 970 that may be closest to the particular point of the second point cloud 980 may be a corresponding point, as described above. For example, the point 972*a* may be the closest particular point of the first point cloud 970 that may be closest to the point 982*a* of the second point cloud 980. In some embodiments, the closest particular point of the first point cloud 970 that may be closest to the particular point of the second point cloud 980 may not be a corresponding point. In some embodiments, the closest particular point of the first point cloud 970 may not be the absolute closest point to the particular point of the second point cloud 980 but may be the closest particular point to the particular point of the second point cloud 980 in a given plane, orientation, etc.

The online HD map system 110 may determine a second vector (e.g., 984*a* and 984*c*) between the closest particular point of the first point cloud 970 that may be closest to a particular point of the second point cloud 980 that may indicate a positional relationship between the closest particular point of the first point cloud 970 and the particular point of the second point cloud 980. In some embodiments, for example, the point 972*c* may be the closest particular point of the first point cloud 970 that may be closest to the point 982*b* of the second point cloud 980 but may not necessarily be a corresponding point, as described above. The second vector 984*c* may indicate a positional relationship between the point 972*c* of the first point cloud 970 and point 982*b* of the second point cloud 980. The second vector 984*c* may be of a different magnitude and direction of the first vector 974*a*.

In some embodiments, it may be expected or predicted that the closest particular point of the first point cloud 970 to point 982*b* would be the point 972*b* rather than the point 972*c* and that a positional relationship between the closest particular point of the first point cloud 970 and the point 982*b* would be a third vector 984*b*. However, the online HD map system 110 may be configured to determine the closest particular point of the first point cloud 970 in terms of distance between the points and on a point-by-point basis, rather than considering the corresponding points between the one or more points of the first point cloud 970 and one or more points of the second point cloud 980 and the correspondences between the first point cloud 970 and the second point cloud 980 as a whole.

In some embodiments, the online HD map system 110 may determine a measure of usefulness or localization usefulness of a particular point based on the relationship between the first vector and the second vector. The measure of usefulness of may be an indication of the reliability and/or helpfulness of the particular point in localization. For example, the particular point may contribute more to the convergence and/or divergence of the ICP process during localization. In some embodiments, the particular point may be more useful or may have a higher measure of usefulness than another point if the second vector is of direction and magnitude that may be expected, predictable, and/or that may match or may be similar to the direction and magnitude of the first vector. For example, as illustrated in FIG. 9A, the first vector 974*a* may begin at point 972*a* and may end at point 982*a*. Similarly, the second vector 984*a* may begin at point 972*a* and may end at point 982*a*. In other words, the second vector 984*a* may match the movement represented by the first vector 974*a* and may have the same direction and magnitude as the first vector 974*a*. In some embodiments, the behavior of the second vector 984*a* may be seen as expected or predictable and the point 972*a* may be determined to be useful or may have a high level of usefulness for localization purposes.

In contrast, the particular point may be less useful or may have a lower measure of usefulness than another point if the magnitude of the first vector and the second vector are not similar or the same and if the direction of the first vector and the second vector is not similar or the same. For example, the first vector 974*b* may begin at point 972*b* and may end at point 982*b*. However, the second vector 984*c* may not behave as predicted or expected or may not be as useful for localization purposes. The second vector 984*c* may be predicted or expected to behave as a third vector 984*b* and to begin at point 982*b* and end at point 972*b*. However, a closest particular point of the first point cloud 970 to the point 972*b* of the second point cloud 990 may be point 982*c*. The second vector 984*c* may be of a different magnitude and in a different direction than the first vector 974*a*. Thus, the point 972*b* may be less useful or may have a lower level of usefulness for localization purposes.

FIG. 9B illustrates another example of determining localization usefulness. In FIG. 9B, the first point cloud 970 may include one or more points (e.g., points 976*a*, 976*b*, 976*c*, and 976*d*) and the second point cloud 980 may be a copy of the first point cloud 970 and may include one or more corresponding points (e.g., corresponding points 986*a* and 986*b*). The second point cloud 980 may be moved in a positive x-direction and a positive y-direction according to a first vector 978*a*. The first vector 978*a* may represent the direction and magnitude of the move of the second point cloud 970.

In some embodiments, the point 976*d* may be the closest particular point of the first point cloud 970 that may be closest to the point 986*a* of the second point cloud 980. A second vector 988*a* may indicate a positional relationship between the point 976*d* of the first point cloud 970 and point 986*a* of the second point cloud 980. The second vector 988*a* may be of different magnitude and direction of the first vector 978*a*.

In some embodiments, the point 976*c* may be the closest particular point of the first point cloud 970 that may be closest to the point 986*b* of the second point cloud 980. A third vector 988*c* may indicate a positional relationship between the point 976*c* of the first point cloud 970 and point 986*b* of the second point cloud 980. The third vector 988*c* may be of different magnitude and direction of the first vector 978*a*.

In some embodiments, the point 976*a* may be more useful or may have a higher measure of usefulness for localization purposes than the point 976*c* because the direction and magnitude of the second vector 988*a* may more similar to the direction and magnitude of the first vector 978*a*. In contrast, the point 976*c* may be less useful or may have a lower measure of usefulness for localization purposes than the point 976*a* because the direction and magnitude of the third vector 988*c* may less closely follow the direction and magnitude of the first vector 978*a*.

In some embodiments, usefulness of the movement of each point with respect to ICP convergence may be determined as a movement usefulness. For example, the movement usefulness may be determined using the following equation:

$$I_i = \left(1 - \frac{|\vec{C} - \delta\vec{p_i}|}{\max(|\vec{C}|, |\delta\vec{p_i}|)}\right)^2 (\vec{C} \cdot \delta\vec{p_i})$$

where $I_{move}$=movement usefulness;

$\delta\vec{p_i}$=first vector representing the sample delta positions of each point in the second point cloud with respect to the first point cloud; and $\vec{C}$=second vector representing a locational relationship between a closest point of the first point cloud that is closest to a point of the second point cloud after moving the second point cloud.

The first vector, $\delta\vec{p_i}$, may be systematically sampled. In some embodiments, the the first vector, $\delta\vec{p_i}$, may be systematically sampled in the XY plane. For example, the first vector in the X plane, $\delta\vec{p_x}$, may be sampled from 5 cm to 50 cm in steps of 5 cm, and the first vector in the Y plane, $\delta\vec{p_y}$, may be sampled from 5 cm to 50 cm in steps of 5 cm. This systematic sampling may yield a 10 cm by 10 cm grid of samples which may contain a total of 100 samples of the first vector, $\delta\vec{p_i}$.

In some embodiments, an aggregate usefulness value may be calculated. For example, the aggregate usefulness may be determined by aggregating the usefulness values, $I_i$, computed at each of the sampled delta positions, $\delta\vec{p_i}$. The aggregate usefulness value may be determined using any suitable technique. For example, in some embodiments, the aggregate usefulness value may be determined using the mean of the usefulness values, using the following equation:

$$I_{aggregate} = \frac{\sum_{i=0_i}^{N}}{N}$$

As another example, the aggregate usefulness value may be determined using the maximum value of the usefulness values, using the following equation:

$$I_{aggregate} = \max(I_i)$$

In some embodiments, the movement usefulness may be a scalar value without a direction. In some embodiments, the online HD map system 110 may be able to differentiate between directions when calculating movement usefulness. In some embodiments, the online HD map system 110 may be able to differentiate between the x direction, y direction, z direction, and rotation directions (i.e., yaw, pitch, roll). In other words, the movement usefulness may vary depending on the corresponding movement of the second point cloud 980 with respect to the first point cloud 970.

In some embodiments, the usefulness metric may be a multidimensional value that may have a component along each of a plurality of directions, for example, it may be a three-dimensional value with one or more values in each of the x, y, and z directions. In some embodiments, the component along each direction may have a different value (i.e., the point may have a high usefulness metric value in one direction but may have a low usefulness metric value in another direction). For example, in a tunnel the usefulness metric in the direction of the tunnel may be very low (since one or more points along a given direction may have similar features/characteristics) but the usefulness value normal or perpendicular to the tunnel walls may be high. However, in some embodiments, if there are one or more distinguishable features along one or more walls in the direction of the tunnel, the usefulness of the one or more points along the direction of the tunnel may be high.

In some embodiments, the maximum usefulness of a given point may be determined. In some embodiments, the maximum usefulness may be in a given direction. For example, a point A may have a usefulness of 1 in the x direction, 2 in the y direction, and 3 in the z direction. Thus, the maximum usefulness for point A may be in the z direction, or in other words the maximum usefulness for point A may be 3. In some embodiments, the usefulness values may be an average of each of the usefulness values in each given direction. For example, a point $A_x1$ may have a usefulness value of 1, a point $A_x2$ may have a usefulness value of 2, and a point $A_x3$ may have a usefulness value of 3 and a point $A_y1$ may have a usefulness value of 2, a point $A_y2$ may have a usefulness value of 3, and a point $A_y3$ may have a usefulness value of 4. The maximum usefulness value in the x direction may be an average of each of the usefulness values for the points $A_x1$, $A_x2$, and $A_x3$, or, in other words the usefulness value in the x direction may be 2. The maximum usefulness value in they direction may be an average of each of the usefulness values for the points $A_y1$, $A_y1$, and $A_y3$, or, in other words the usefulness value in the y direction may be 3. Thus, the maximum usefulness value may be in the y direction and may be 3. Thus, as explained in the examples above, the maximum usefulness value may vary depending on the parameter used to determine the usefulness value in the given direction.

In some embodiments, the usefulness value may be positive or negative. A positive usefulness value may indicate that the given point contributes to the convergence to a determined result and may increase the usefulness of the given point. A negative usefulness value may indicate that the given point contributes to the divergence to a determined result and may decrease the usefulness of the given point.

In some embodiments, the online HD map system 110 may be configured to not determine the usefulness value along each of the six degrees of freedom (i.e., x, y, z, pitch, yaw, roll). In some embodiments, the online HD map system 110 may determine the usefulness value in a direction determined to have the largest degree of uncertainty, which often is the direction in which a vehicle may be travelling. For example, the online HD map system 110 traveling through a tunnel may determine that the usefulness value in forward direction may be more valuable than the usefulness value in other directions. In some embodiments, the direction with the largest degree of uncertainty may be calculated with a constrainedness measure from an HD map as the eigenvector associated with the smallest eigenvector. and may indicate the usefulness of the plurality of points of the point cloud in the point cloud.

In some embodiments, the online HD map system 110 may identify one or more clusters of points with high usefulness values and may mark them. In some embodiments, the online HD map system 110 may use these points during localization. For example, the online HD map system 110 may identify points on tree trunks, poles, etc. that may allow for more efficient localization, as a result of their high usefulness values, and may only use those points for localization or may assign them higher usefulness during localization. In some embodiments, the online HD map system 110 may repeat the computation for a given point using one or more point clouds captured from various vehicles or various tracks of vehicles and may aggregate the usefulness metric values over multiple computations. For example, the online HD map system 110 may determine the usefulness for the given point with respect to a plurality of point clouds by repeating the method described herein. The usefulness of the given point with respect to a plurality of point clouds may be aggregated over multiple computations to find an aggregate usefulness.

In some embodiments, the computation of the usefulness metric may be performed by the online HD map system 110 in an offline manner (i.e., when the vehicle 150 may not be driving but may have provided one or more point clouds captured during a driving session in a region to the online HD map system 110). In some embodiments, the online HD map system 110 may use a point cloud obtained by a lidar scan as the first point cloud 970 and the OMap 530 as a second point cloud 980 and may determine the usefulness of points in the online HD map system 110 (e.g., OMap 530). In some embodiments, the online HD map system 110 may annotate the OMap points and may store the respective usefulness metric values for each of the OMap points for use by other vehicles that may drive in the region. In some embodiments, when the vehicle 150 online HD map system 110 is driving in the region, the online HD map system 110 of the vehicle 150 may receive the HD map for the region. In some embodiments, as the online HD map system 110 performs localization, the online HD map system 110 may assign usefulness to points based on their usefulness values. In some embodiments, the online HD map system 110 may filter points based on their respective usefulness values, for example, by removing or ignoring points that have less than a threshold usefulness. Accordingly, the online HD map system 110 may have fewer points remaining for performing localization. However, the remaining points may be of high usefulness and may help achieve localization more quickly and more efficiently. In some embodiments, the online HD map system 110 may perform sampling of the points such that points with higher usefulness may have a higher likelihood of being selected. As a result, in some embodiments, the point cloud generated from sampling may have a higher chance of including points with high usefulness. The online HD map system 110 may filter points based on their respective weights. For example, the online HD map system 110 may filter out, remove, or ignore points that may be determined to have less than a threshold weight. The filtering out, removal of points, or ignoring of points may improve the speed of determining the usefulness of points for localization. Additionally or alternatively, the online HD map system 110 may maintain, keep, or use points that may be determined to have more than a threshold weight.

Figure 9C:
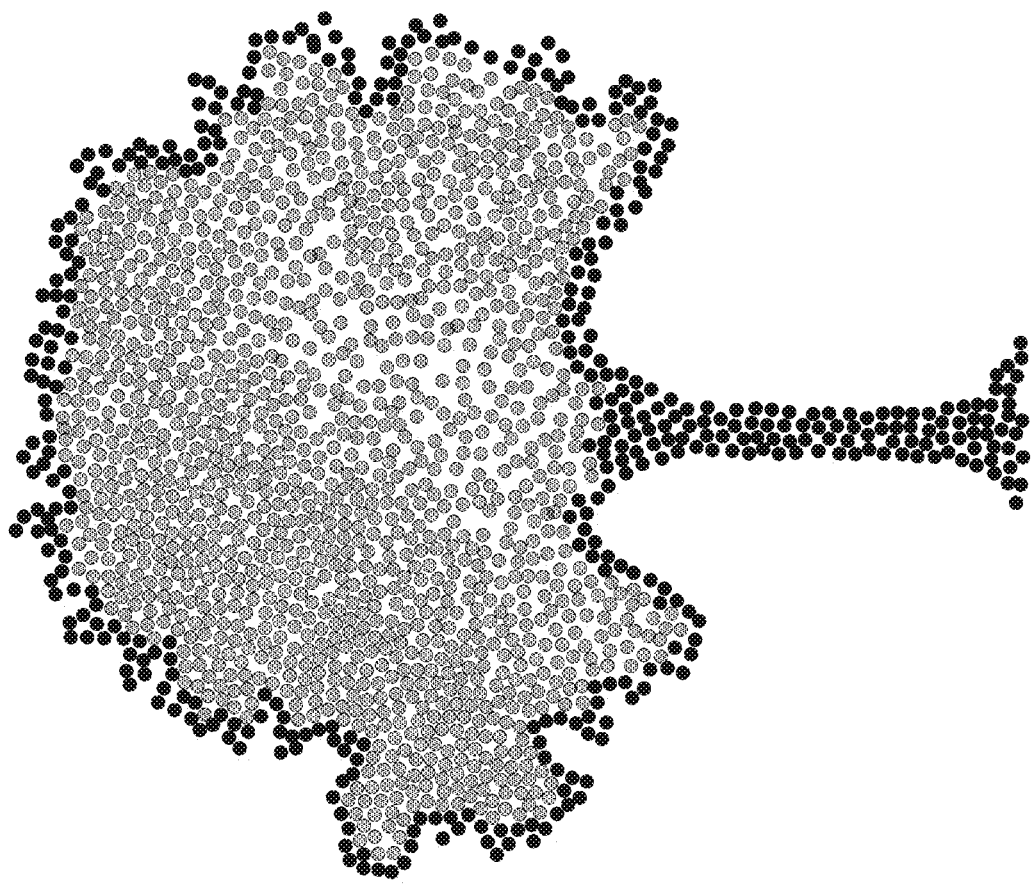
FIG. 9C illustrates an example of a point cloud associated with a tree in which different points have been given different weights according to determined usefulness.

FIG. 9C illustrates an example of a point cloud 950 associated with a tree in which different points have been given different weights according to determined usefulness. For example, using the techniques described herein, the points associated with the trunk of the tree and outside of the tree may have a higher degree of usefulness than points associated with an interior of the tree and may be weighted accordingly. The higher weighting based on the degree of usefulness may be represented by having the higher weighted points being darker than the lower weighted points.

Figure 9D:
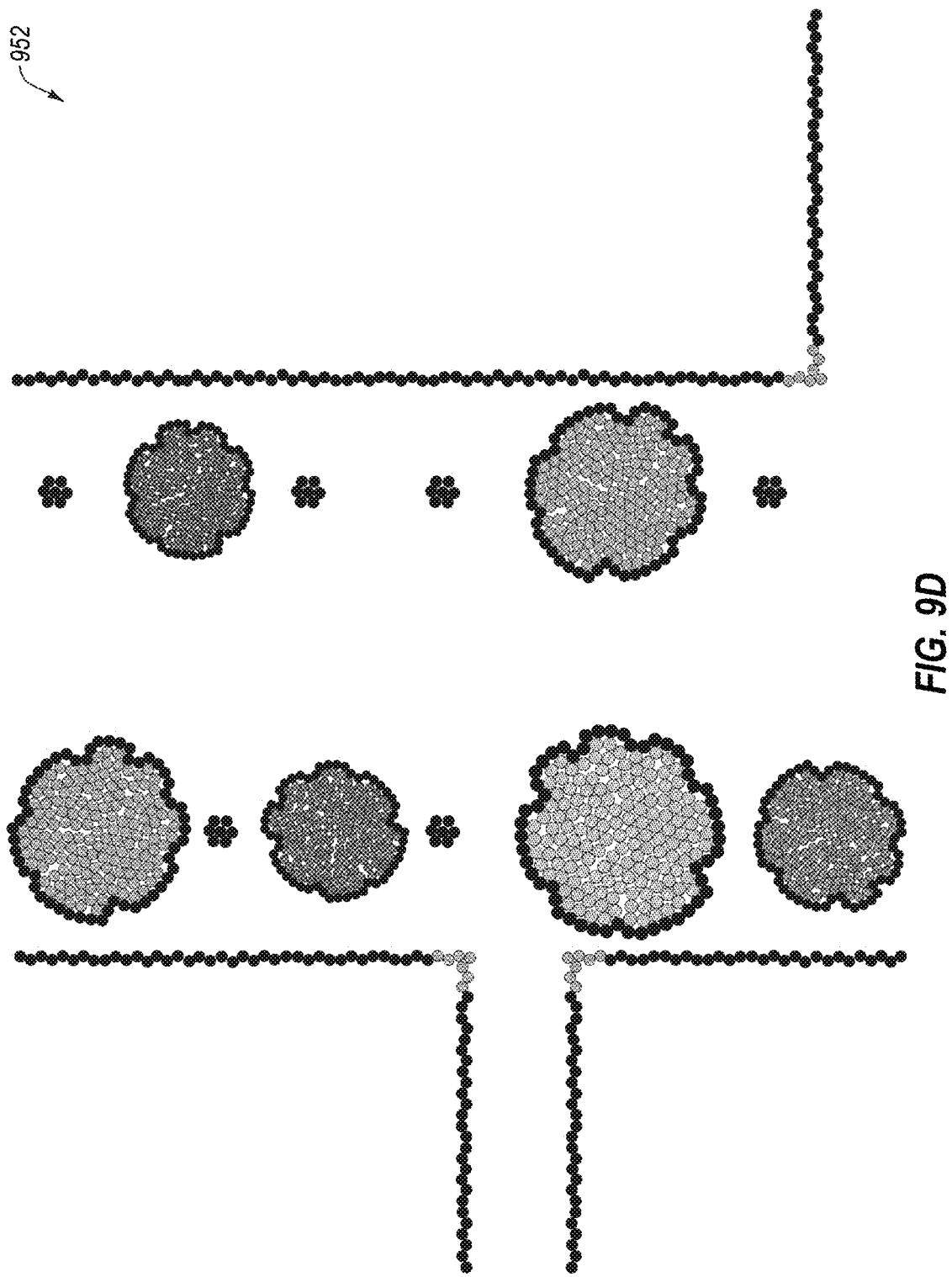
FIG. 9D illustrates a top-view of an example of a point cloud associated with a setting in which different points have been given different weights according to determined usefulness.

FIG. 9D illustrates a top-view of an example of a point cloud 952 associated with a setting. Similar to as described above with respect to FIG. 9C, points that have been determined as having a higher degree of usefulness and that are thus higher weighted are represented as being darker than lower weighted points.

Figure 10:
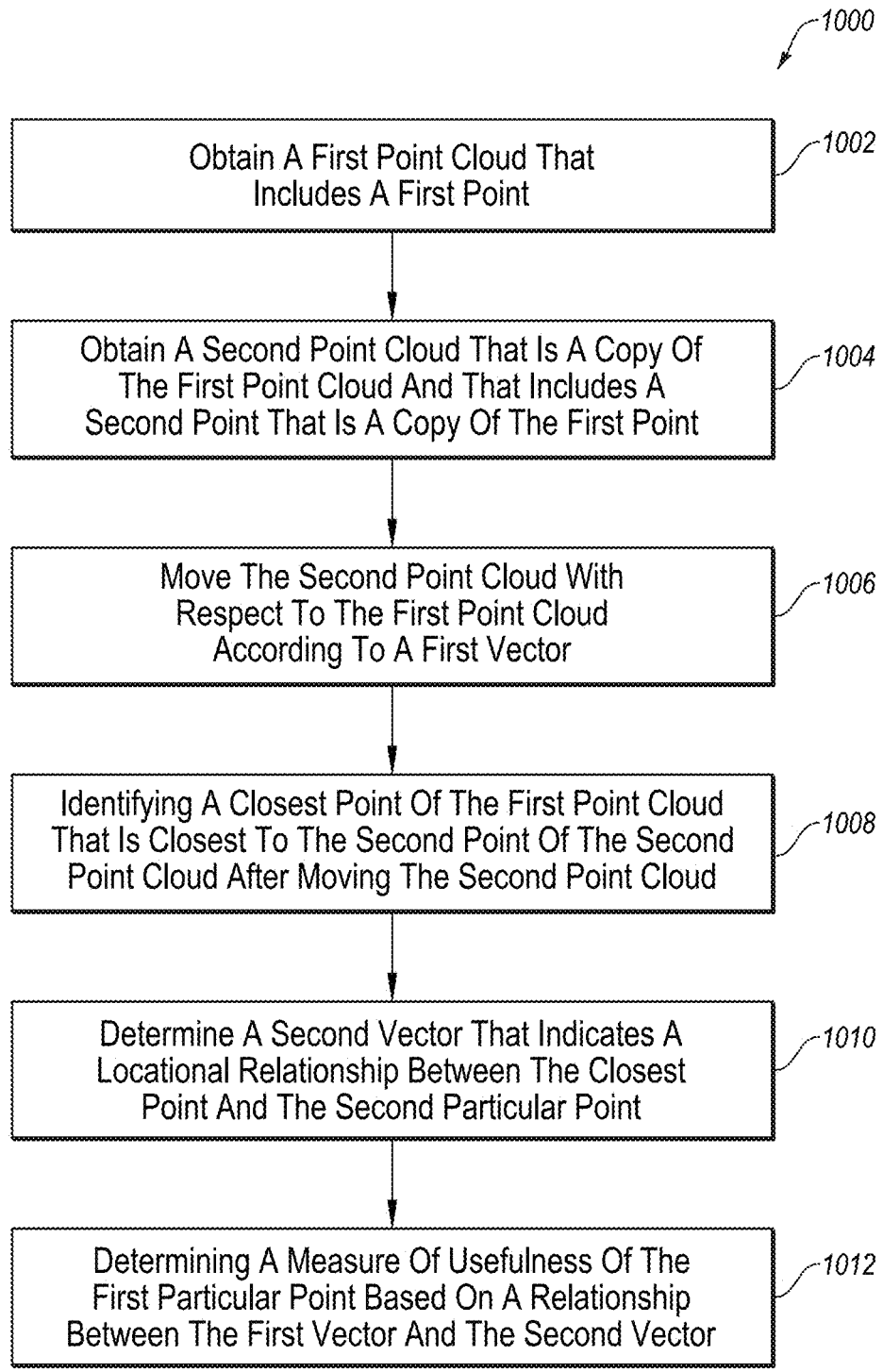
FIG. 10 illustrates an example method of determining localization usefulness.

FIG. 10 is a flowchart of an example method of determining localization usefulness, according to at least one embodiment of the present disclosure. The method 1000 may be performed by any suitable system, apparatus, or device. For example, one or more elements of the HD map system 100 of FIG. 1 may be configured to perform one or more of the operations of the method 1000. Additionally or alternatively, the online HD map system 110 may be configured to perform one or more of the operations associated with the method 1000. Although illustrated with discrete blocks, the steps and operations associated with one or more of the blocks of the method 1000 may be divided into additional blocks, combined into fewer blocks, or eliminated, depending on the particular implementation.

At block 1002 a first point cloud that may include a first point may be obtained. The first point cloud may be obtained via the online HD map system 110 and may include data obtained from LIDAR scans from one or more LIDARs, GPS data obtain from one or more GPSs, and/or HD map data. The first point may be determined by the online HD map system 110.

At block 1004, a second point cloud that may be a copy of the first point cloud and that may include a second point that may be a copy of the first point may be obtained. The second point cloud including, but not limited to, the second point may be created by the online HD map system 110. In some embodiments, a third point cloud that may be a copy of the first point cloud and may include a third point may be obtained.

At block 1006, the second point cloud may be moved with respect to the first point cloud according to a first vector. The second point cloud may be moved in any direction according to the first vector in one or more dimensions. The first vector may be associated with a first direction. In some embodiments, the third point cloud may be moved with respect to the first point cloud in a second direction that may differ from the first direction according to a third vector.

At block 1008, a closest point of the first point cloud that is closest to the second point of the second point cloud after moving the second point cloud may be identified. The closest point of the first point cloud may not be the absolute closest point to the point of the second point cloud. In some embodiments, the closest point of the first point cloud may be the closest point to the point of the second point cloud in a given plane, orientation, etc.

At block 1010, a second vector that may indicate a locational relationship between the closest point and the second point may be determined.

At block 1012, a measure of usefulness of the first point with respect to mapping other point clouds to the first point cloud based on a relationship between the first vector and the second vector may be determined. The determining of the measure of usefulness may comprise comparing the first vector against the second vector and determining the relationship between the first vector and the second vector based on the comparing. In some embodiments, the similarity between the direction and/or magnitude of the first vector and the second vector may be an indication of the usefulness of the first point.

At block 1012, the measure of usefulness of the first point in the first point cloud may be indicated.

In some embodiments, the first point of a high definition map of a region that may correspond to the first particular point with the measure of usefulness of the first particular point may be annotated. In some embodiments, localization of a vehicle in the region using the first point of the high definition map may be performed. In some embodiments, the first particular point according to the measure of usefulness of the first particular point may be assigned a usefulness. In some embodiments, one or more particular points of the first point cloud may be sampled such that the one or more particular points that may have a higher measure of usefulness may have a higher likelihood of being sampled compared to the one or more particular points that may have a lower measure of usefulness.

Modifications, additions, or omissions may be made to the method 1000 without departing from the scope of the present disclosure. For example, the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Further, although the measures of usefulness have been described in the context of localization of vehicles, the concepts described in the present disclosure are not limited to such. The techniques described herein may be applicable to any suitable scenario in which the mapping of point clouds may be performed (e.g., via ICP).

Computing Machine Architecture

Figure 11:
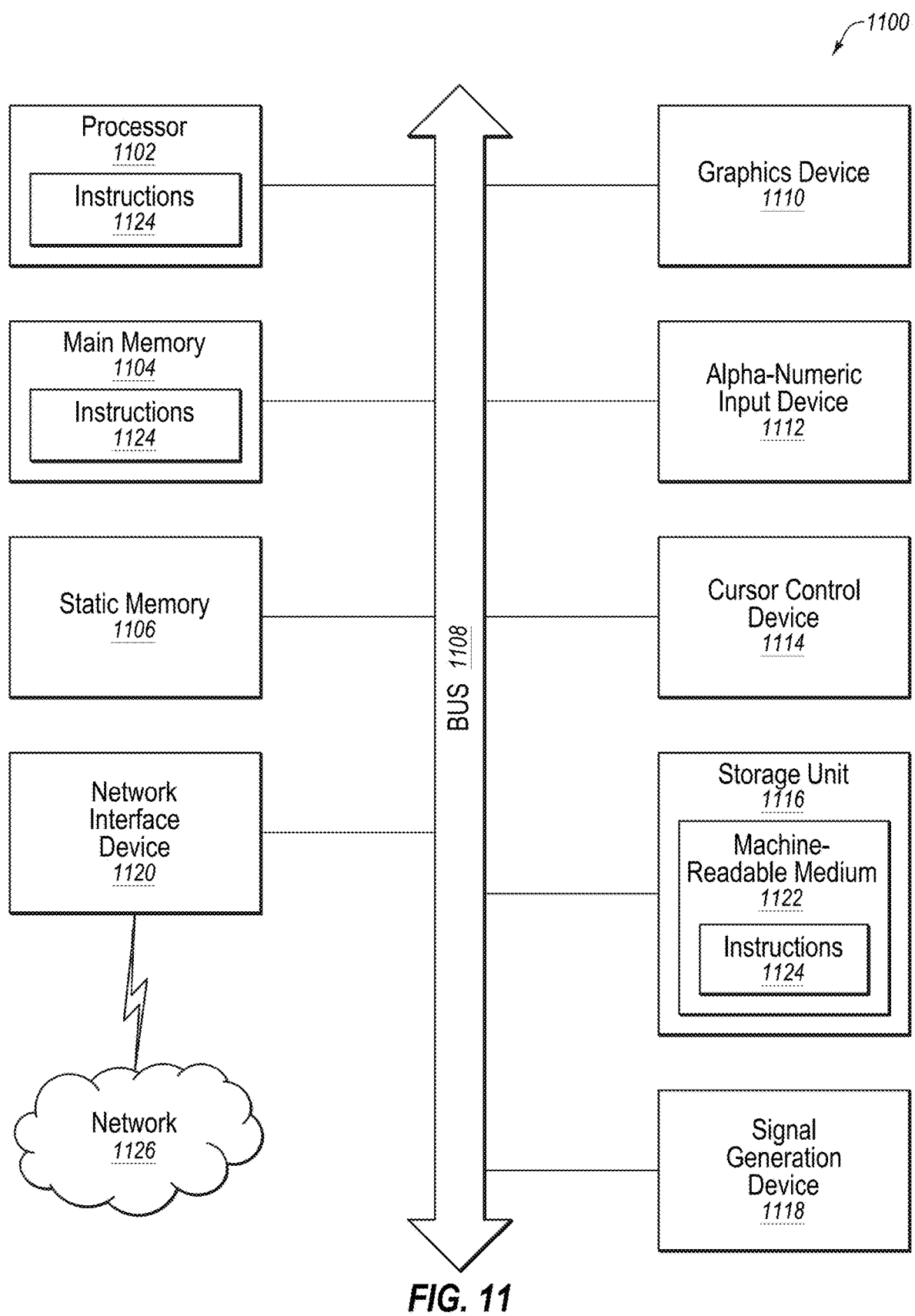
FIG. 11 illustrates an example embodiment of a computing machine that can read instructions from a machine-readable medium and execute the instructions in a processor or controller.

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

In addition, the language used in the specification may have been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (e.g., stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    moving a first point cloud that includes a first point with respect to a second point cloud based at least on a first vector, the second point cloud being a copy of the first point cloud and including a second point that is a copy of the first point;
    identifying a closest point of the first point cloud that is closest to the second point of the second point cloud after moving the second point cloud;
    determining a second vector corresponding to a locational relationship between the closest point and the second point; and
    determining a measure of usefulness corresponding to the first point with respect to mapping other point clouds to the first point cloud based at least on a relationship between the first vector and the second vector,
    wherein a machine performs one or more control operations based at least on the measure of usefulness.

2. The method of claim 1, wherein
    the determining the relationship between the first vector and the second vector is based at least on comparing the first vector to the second vector.

3. The method of claim 1, wherein the first vector is associated with a first direction and wherein the method further comprises:
    moving, based at least on a third vector, a third point cloud with respect to the first point cloud in a second direction different from the first direction, the third point cloud being a second copy of the first point cloud and including a third point that is a second copy of the first point; and
    wherein the determining the measure of usefulness corresponding to the first point is further based at least on a second relationship between the first vector and the third vector.

4. The method of claim 1, wherein the first vector is associated with a first direction and wherein the method further comprises:
    moving, based at least on a third vector, a third point cloud with respect to the first point cloud in a second direction different from the first direction, the third point cloud being a second copy of the first point cloud and including a third point that is a second copy of the first point;
    determining a second measure of usefulness corresponding to the first point based at least on a second relationship between the first vector and the third vector;
    moving, based at least on a fourth vector, a fourth point cloud with respect to the first point cloud in a third direction different from the first direction and the second direction, the fourth point cloud being a third copy of the first point cloud and including a fourth point that is a third copy of the first point;
    determining a third measure of usefulness corresponding to the first point based at least on a third relationship between the first vector and the fourth vector; and
    determining an aggregate measure of usefulness corresponding to the first point based at least on aggregating two or more of: the measure of usefulness as determined based at least on the relationship between the first vector and the second vector, the second measure of usefulness as determined based at least on the second relationship between the first vector and the third vector, or the third measure of usefulness as determined based at least on the third relationship between the first vector and the fourth vector.

5. The method of claim 1, further comprising:
    annotating map data with the measure of usefulness corresponding to the first point, wherein:
    localization of the machine is performed based at least on the annotation of the measure of usefulness, and
    performance of the one or more control operations by the machine is based at least on the localization.

6. The method of claim 1, further comprising:
    annotating map data with a weight derived from the measure of usefulness corresponding to the first point, wherein:
    localization of the machine is performed based at least on the annotation of the weight, and
    performance of the one or more control operations by the machine is based at least on the localization.

7. The method of claim 1, further comprising:
    filtering, during a mapping to the first point cloud of a different point cloud, a plurality of points of the first point cloud based at least on respective measures of usefulness corresponding to the plurality of points such that one or more points corresponding to lower measures of usefulness have a higher likelihood of being filtered out compared to one or more points corresponding to higher measures of usefulness.

8. The method of claim 1, further comprising assigning a usefulness score to the first point based at least on the measure of usefulness corresponding to the first point.

9. The method of claim 1, further comprising:
    sampling, during a mapping to the first point cloud of a different point cloud, a plurality of points of the first point cloud based at least on respective measures of usefulness corresponding to the plurality of points such that one or more points corresponding to higher measures of usefulness have a higher likelihood of being sampled compared to the one or more points corresponding to lower measures of usefulness.

10. The method of claim 1, wherein the first vector is determined based at least on a potential movement of the machine.

11. A processor comprising processing circuitry to perform operations comprising:
  moving a first point cloud that includes a first point with respect to a second point cloud based at least on a first vector, the second point cloud being a copy of the first point cloud and including a second point that is a copy of the first point;
  identifying a closest point of the first point cloud that is closest to the second point of the second point cloud after moving the second point cloud;
  determining a second vector corresponding to a locational relationship between the closest point and the second point; and
  determining a measure of usefulness corresponding to the first point with respect to mapping other point clouds to the first point cloud based at least on a relationship between the first vector and the second vector,
  wherein a machine performs one or more control operations based at least on the measure of usefulness.

12. The processor of claim 11, wherein
the determining the relationship between the first vector and the second vector is based at least on comparing the first vector to the second vector.

13. The processor of claim 11, wherein the first vector is associated with a first direction and wherein the operations further comprise:
  moving, based at least on a third vector, a third point cloud with respect to the first point cloud in a second direction different from the first direction, the third point cloud being a second copy of the first point cloud and including a third point that is a second copy of the first point; and
  wherein the determining the measure of usefulness corresponding to the first point is further based at least on a second relationship between the first vector and the third vector.

14. The processor of claim 11, wherein the first vector is associated with a first direction and wherein the operations further comprise:
  moving, based at least on a third vector, a third point cloud with respect to the first point cloud in a second direction different from the first direction, the third point cloud being a second copy of the first point cloud and including a third point that is a second copy of the first point;
  determining a second measure of usefulness corresponding to the first point based at least on a second relationship between the first vector and the third vector;
  moving, based at least on a fourth vector, a fourth point cloud with respect to the first point cloud in a third direction different from the first direction and the second direction, the fourth point cloud being a third copy of the first point cloud and including a fourth point that is a third copy of the first point;
  determining a third measure of usefulness corresponding to the first point based at least on a third relationship between the first vector and the fourth vector; and
  determining an aggregate measure of usefulness corresponding to the first point based at least on aggregating two or more of: the measure of usefulness as determined based at least on the relationship between the first vector and the second vector, the second measure of usefulness as determined based at least on the second relationship between the first vector and the third vector, or the third measure of usefulness as determined based at least on the third relationship between the first vector and the fourth vector.

15. The processor of claim 11, wherein the operations further comprise:
  annotating map data with the measure of usefulness corresponding to the first point, wherein:
  localization of the machine is performed based at least on the annotation of the measure of usefulness, and
  performance of the one or more control operations by the machine is based at least on the localization.

16. The processor of claim 11, wherein the operations further comprise:
  annotating map data with a weight derived from the measure of usefulness corresponding to the first point, wherein:
  localization of the machine is performed based at least on the annotation of the weight, and
  performance of the one or more control operations by the machine is based at least on the localization.

17. The processor of claim 11, wherein the operations further comprise:
  filtering, during a mapping to the first point cloud of a different point cloud, a plurality of points of the first point cloud based at least on respective measures of usefulness corresponding to the plurality of points such that one or more points corresponding to lower measures of usefulness have a higher likelihood of being filtered out compared to one or more points corresponding to higher measures of usefulness.

18. The processor of claim 11, wherein the operations further comprise assigning a usefulness score to the first point based at least on the measure of usefulness corresponding to the first point.

19. The processor of claim 11, wherein the operations further comprise:
  sampling, during a mapping to the first point cloud of a different point cloud, a plurality of points of the first point cloud based at least on respective measures of usefulness corresponding to the plurality of points such that one or more points corresponding to higher measures of usefulness have a higher likelihood of being sampled compared to the one or more points corresponding to lower measures of usefulness.

20. The processor of claim 11, wherein the first vector is determined based at least on a potential movement of the machine.

21. A system comprising:
  one or more processors to perform operations comprising:
  moving a first point cloud that includes a first point with respect to a second point cloud based at least on a first vector, the second point cloud being a copy of the first point cloud and including a second point that is a copy of the first point;
  identifying a closest point of the first point cloud that is closest to the second point of the second point cloud after moving the second point cloud;
  determining a second vector corresponding to a locational relationship between the closest point and the second point; and
  determining a measure of usefulness corresponding to the first point with respect to mapping other point clouds to the first point cloud based at least on a relationship between the first vector and the second vector,
  wherein a machine performs one or more control operations based at least on the measure of usefulness.

22. The system of claim 21, wherein
the determining the relationship between the first vector and the second vector is based at least on comparing the first vector to the second vector.

23. The system of claim 21, wherein the first vector is associated with a first direction and wherein the operations further comprise:
moving, based at least on a third vector, a third point cloud with respect to the first point cloud in a second direction different from the first direction, the third point cloud being a second copy of the first point cloud and including a third point that is a second copy of the first point; and
wherein the determining the measure of usefulness corresponding to the first point is further based at least on a second relationship between the first vector and the third vector.

24. The system of claim 21, wherein the first vector is associated with a first direction and wherein the operations further comprise:
moving, based at least on a third vector, a third point cloud with respect to the first point cloud in a second direction different from the first direction, the third point cloud being a second copy of the first point cloud and including a third point that is a second copy of the first point;
determining a second measure of usefulness corresponding to the first point based at least on a second relationship between the first vector and the third vector;
moving, based at least on a fourth vector, a fourth point cloud with respect to the first point cloud in a third direction different from the first direction and the second direction, the fourth point cloud being a third copy of the first point cloud and including a fourth point that is a third copy of the first point, the third direction differing from the first direction and the second direction according to a third vector;
determining a third measure of usefulness corresponding to the first point further based on based at least on a third relationship between the first vector and the fourth vector; and
determining an aggregate measure of usefulness corresponding to the first point based at least on aggregating two or more of: the measure of usefulness as determined based at least on the relationship between the first vector and the second vector, the second measure of usefulness as determined based at least on the second relationship between the first vector and the third vector, or the third measure of usefulness as determined based at least on the third relationship between the first vector and the fourth vector.

25. The system of claim 21, wherein the operations further comprise:
annotating map data with the measure of usefulness corresponding to the first point, wherein:
localization of the machine is performed based at least on the annotation of the measure of usefulness, and
performance of the one or more control operations by the machine is based at least on the localization.

26. The system of claim 21, wherein the operations further comprise:
annotating map data with a weight derived from the measure of usefulness corresponding to the first point, wherein:
localization of the machine is performed based at least on the annotation of the weight, and
performance of the one or more control operations by the machine is based at least on the localization.

27. The system of claim 21, wherein the operations further comprise:
filtering, during a mapping to the first point cloud of a different point cloud, a plurality of points of the first point cloud based at least on respective measures of usefulness corresponding to the plurality of points such that one or more points corresponding to lower measures of usefulness have a higher likelihood of being filtered out compared to one or more points corresponding to higher measures of usefulness.

28. The system of claim 21, wherein the operations further comprise assigning a usefulness score to the first point based at least on the measure of usefulness corresponding to the first point.

29. The system of claim 21, wherein the operations further comprise:
sampling, during a mapping to the first point cloud of a different point cloud, a plurality of points of the first point cloud based at least on respective measures of usefulness corresponding to the plurality of points such that one or more points corresponding to higher measures of usefulness have a higher likelihood of being sampled compared to the one or more points corresponding to lower measures of usefulness.

30. The system of claim 21, wherein the first vector is determined based at least on a potential movement of the machine.

* * * * *